US010646026B1

(12) United States Patent
Clementi et al.

(10) Patent No.: US 10,646,026 B1
(45) Date of Patent: May 12, 2020

(54) REFUSE BAG WITH HARNESS

(71) Applicants: Frank Clementi, Annandale, VA (US); Amalia Olivera, Annandale, VA (US)

(72) Inventors: Frank Clementi, Annandale, VA (US); Amalia Olivera, Annandale, VA (US)

( * ) Notice: Subject to any disclaimer, the term of this patent is extended or adjusted under 35 U.S.C. 154(b) by 0 days.

(21) Appl. No.: 16/585,169

(22) Filed: Sep. 27, 2019

(51) Int. Cl.
*A45F 5/02* (2006.01)
*E01H 1/12* (2006.01)
*A01K 23/00* (2006.01)

(52) U.S. Cl.
CPC ............ *A45F 5/021* (2013.01); *A01K 23/005* (2013.01); *E01H 1/1206* (2013.01); *A45F 2200/05* (2013.01); *E01H 2001/1286* (2013.01)

(58) Field of Classification Search
CPC ... A45F 5/021; A45F 2200/05; A01K 27/008; A01K 27/006; A01K 23/005; E01H 1/1206; E01H 2001/128; E01H 2001/1286
See application file for complete search history.

(56) References Cited

U.S. PATENT DOCUMENTS

| | | | | |
|---|---|---|---|---|
| 5,265,719 | A * | 11/1993 | Wand ....................... | A45C 3/00 206/223 |
| 5,447,227 | A * | 9/1995 | Kosberg ................ | A01K 1/035 206/223 |
| 5,713,616 | A | 2/1998 | Knudson | |
| 6,257,473 | B1 * | 7/2001 | Ringelstetter ......... | E01H 1/1206 119/795 |
| 7,073,462 | B1 * | 7/2006 | Layman ............... | A01K 27/008 119/161 |
| 7,699,524 | B2 * | 4/2010 | Moore, Sr. .............. | A45C 3/02 150/112 |
| 8,397,915 | B2 | 3/2013 | Davidson | |
| 8,534,725 | B1 | 9/2013 | Burke | |
| 9,004,555 | B1 * | 4/2015 | Chirico ................. | E01H 1/1206 206/223 |
| D789,705 | S * | 6/2017 | Becattini, Jr. .................. | D6/515 |
| 9,828,733 | B2 * | 11/2017 | Levitt ................... | A01K 27/008 |
| 10,028,489 | B1 * | 7/2018 | Smith, Jr. ................ | A45F 5/00 |
| 2009/0101071 | A1 | 4/2009 | Vogl et al. | |
| 2012/0186539 | A1 * | 7/2012 | Johnston .............. | A01K 27/004 119/796 |

OTHER PUBLICATIONS

Earth Rated PoopBags Dispenser with Bags. Product Listing [online]. Copyright © 2019 Chewy, Inc. [retrieved on Apr. 17, 2019]. Retrieved from the Internet: <URL: https://www.chewy.com/earth-rated-poopbags-dispenser-bags/dp/36121?utm_source=google-product&utm_medium=cpc&utm_campaign=hg&utm_content=Earth%20Rated&utm_term=&gclid=CjwKCAjwndvlBRANEiwABrR32CXFRuXPwnryE0Fde6LEMEAs8l3AC7b5FzrESATyHIX2qGuGcY3htxoCSToQAvD_BwE>.
Snap on bag that holds dog bags, personal items, and pet waste in separate compartments! Product Listing [online]. © 2019 Etsy, Inc. [retrieved on Apr. 17, 2019]. Retrieved from the Internet: <URL: https://www.etsy.com/listing/116182564/portable-dog-waste-pouch-snap-on-bag>.

* cited by examiner

*Primary Examiner* — Corey N Skurdal
(74) *Attorney, Agent, or Firm* — Cramer Patent & Design, PLLC; Aaron R. Cramer

(57) ABSTRACT

A refuse bag container incorporates a harness and strap having a magnetic lid. At least one (1) portion of the bag is configured to removal retain a plurality of animal waste storage bags. At least one (1) portion of the bag is configured to retain an air deodorizing agent. The bag may have a walking light disposed adjacent the top lid. The bottom of the bag may have a plurality of holes disposed therein to increase air circulation.

19 Claims, 5 Drawing Sheets

REFUSE BAG WITH HARNESS

RELATED APPLICATIONS

Not applicable.

FIELD OF THE INVENTION

The present invention relates generally to a refuse bag with harness and more specifically refuse bags with harness utilized to collect animal droppings.

BACKGROUND OF THE INVENTION

The act of walking a dog or other pet is a pleasure enjoyed by many pet owners. The ability to get outside and experience nature and the surroundings is a simple joy. There are also great health benefits associated with exercise for both the pet and the human walker. However, one additional task associated with walking of a pet is the cleaning up of droppings. This act is not only the responsible thing to do, but it is the sanitary thing to do as well. The most common method of cleaning up utilizes a plastic bag in which the user grasps the droppings and turns the bag inside out.

While such a method is effective, the user must now carry the bag in his or her hand until they arrive back home or find a suitable refuse collection point. Since the walker is typically holding the leash in their other hand, this means that both hands are occupied. Thus, attending the dogs, perhaps using a cell phone, or even opening a door becomes a difficult proposition. Additionally, the feeling of the droppings next to one's hand separated by only a thin plastic bag make many squeamish and disgusted.

Accordingly, there is a need for a means by which one can quickly and effectively clean up pet droppings while enabling easy hands-free transport of the contained dropping to a suitable refuse collection point. The development of the pet dropping container with harness fulfills this need.

SUMMARY OF THE INVENTION

The principles of the present invention provide for a refuse bag comprising a bag assembly worn about a person's waist on a belt assembly. The belt assembly includes a belt first half with a buckle first half removable mating with a buckle second half of a belt second half. The bag assembly includes a main retention compartment with a pair of bag dispensing compartments located on each side of the belt assembly, each of the pair of bag dispensing compartments are provided with a top flap which are held in place via a fastener. The refuse bag also comprises a logo area which is provided on a front lower face of the main retention compartment and a light assembly which is located on a face of the top flaps. The light assembly is on the main retention compartment immediately above a magnetic catch for illumination purposes. The light assembly also includes a housing that contains a lens assembly and a maintained power switch.

The main retention compartment may be provided with a top flap that is held in place via the magnetic catch. The belt halves may mate with a quick-release buckle. The belt halves, the main retention compartment, and each of the pair of bag dispensing compartments may be each made of nylon. The belt halves may also be made of polyester. The main retention compartment may be made of plastic. The bag dispensing compartments may be shown on either side of the main retention compartment to accommodate either a right-handed person or a left-handed person.

The bag dispensing compartments may be used to each hold a plurality of dropping collection bags provided in a roll format and dispensed through a bottom slot. The top flaps of each of the bag dispensing compartments may be secured by the fastener to allow easy access for refilling of the dropping collection bags. The fastener may be a hook-and-loop fastener. The logo area may display an indicia selected from the group consisting of a product name, a piece of graphics, or a customized letter. The logo area may be produced using glow-in-the-dark ink which in turn may be produced by using glow-in-the-dark paint.

The top flap on the main retention compartment may be open to expose an interior retention area for temporary holding of one or more filled dropping collection bags. The interior retention area may be provided with a liner bag which remains in place to catch one or more spills, one or more drips, one or more leaks, or one or more breaks from the one or more filled dropping collection bags.

The bottom surface of the interior retention area may be provided with a plurality of vent holes to aid in removing foul odors. A side mounted interior storage compartment may be provided to hold a deodorizer. The light assembly may utilize one or more LED's at a high brightness level while utilizing low power supplied by one or more AAA batteries. The one or more AAA batteries may be accessed for replacement via a battery access door on the bottom of the plastic housing. The plastic housing may be made of an impact resistant plastic material.

BRIEF DESCRIPTION OF THE DRAWINGS

The advantages and features of the present invention will become better understood with reference to the following more detailed description and claims taken in conjunction with the accompanying drawings, in which like elements are identified with like symbols, and in which:

Figure 1:
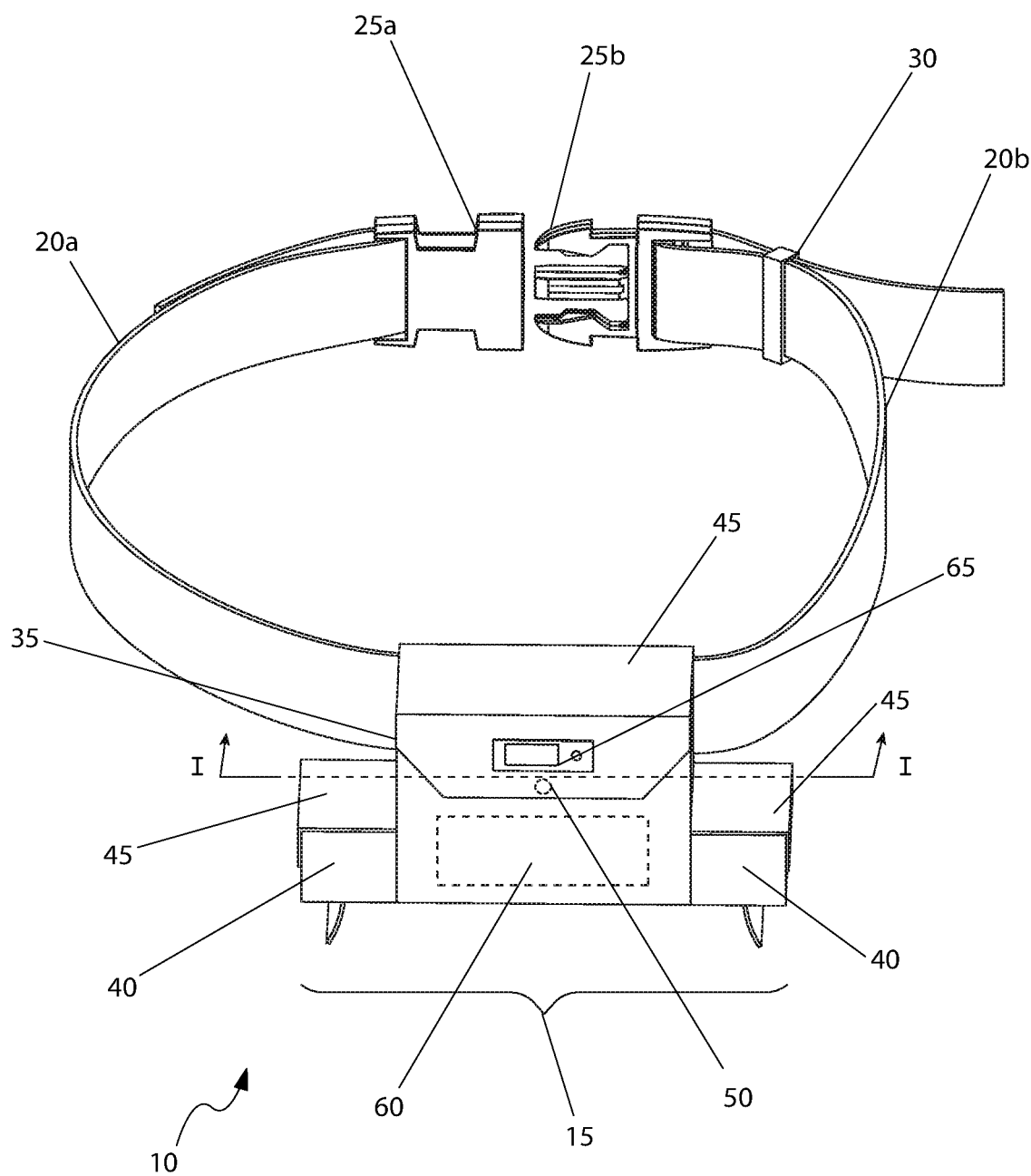
FIG. 1 is a perspective view of the pet dropping container 10, according to the preferred embodiment of the present invention.

DESCRIPTIVE KEY 10 pet dropping container
15 bag assembly
20a belt first half
20b belt second half
25a buckle first half
25b buckle second half
30 belt length adjustment means
35 main retention compartment
40 bag dispensing compartment
45 top flap
50 magnetic catch 55 fastener
60 logo area
65 light assembly
70 dropping collection bag
75 bottom slot
80 plastic housing
85 lens assembly
90 power switch
95 battery access door
100 roll of dropping collection bag
105 interior retention area
110 filled dropping collection bag
115 liner bag
120 vent hole
125 interior storage compartment
130 user
135 waist
140 pet
145 droppings

DESCRIPTION OF THE PREFERRED EMBODIMENTS

The best mode for carrying out the invention is presented in terms of its preferred embodiment, herein depicted within FIGS. 1 through 5. However, the invention is not limited to the described embodiment, and a person skilled in the art will appreciate that many other embodiments of the invention are possible without deviating from the basic concept of the invention and that any such work around will also fall under scope of this invention. It is envisioned that other styles and configurations of the present invention can be easily incorporated into the teachings of the present invention, and only one (1) particular configuration shall be shown and described for purposes of clarity and disclosure and not by way of limitation of scope. All of the implementations described below are exemplary implementations provided to enable persons skilled in the art to make or use the embodiments of the disclosure and are not intended to limit the scope of the disclosure, which is defined by the claims.

The terms "a" and "an" herein do not denote a limitation of quantity, but rather denote the presence of at least one (1) of the referenced items.

1. Detailed Description of the Figures

Referring now to FIG. 1, a perspective view of the pet dropping container 10, according to the preferred embodiment of the present invention is disclosed. The pet dropping container (herein also described as the "container") 10, includes a bag assembly 15 worn about the waist on a belt assembly, which includes a belt first half 20a with a buckle first half 25a capable of removable mating with a buckle second half 25b of a belt second half 20b. The belt halves 20a, 20b are envisioned to be approximately one inch (1 in.) wide and manufactured from nylon and/or polyester. The buckle halves 25a, 25b are preferably mating features of a quick-release buckle 25. A belt length adjustment means 30 to allow for utilization by users of all sizes.

The bag assembly 15 includes a center main retention compartment 35 with two (2) bag dispensing compartments 40 located on either side as shown. The main retention compartment 35 is manufactured from nylon and/or plastic and is approximately six inches (6 in.) wide, five inches (5 in.) tall, and five inches (5 in.) deep. Each of the two (2) bag dispensing compartments 40 are made of the same material as the main retention compartment 35 and are approximately three inches (3 in.) wide, three inches (3 in.) tall, and five inches (5 in.) deep. The main retention compartment 35 is provided with a top flap 45 that is held in place via a magnetic catch 50 (here shown by dashed lines due to its hidden nature). Each of the two (2) bag dispensing compartment) 40 are provided with a top flaps 45 as well which are held in place via a fastener 55 (not shown due to illustrative limitations). It is preferred the fastener 55 is a hook-and-loop-style of fastener.

The front lower face of the main retention compartment 35 is provided with a logo area 60 for display of product name, graphics, and/or customized letter. This logo area 60 may be produced using glow-in-the-dark inks or paints. A light assembly 65 is located on the face of the top flaps 45 on the main retention compartment 35 immediately above the magnetic catch 50 for illumination purposes. Further description of the light assembly 65 will be provided herein below. It is envisioned that the bag assembly 15 can be provided in different colors and styles to suit individual tastes. As such the use of any specific color or styling associated with the container 10 is not intended to be a limiting factor of the present invention.

Figure 2:
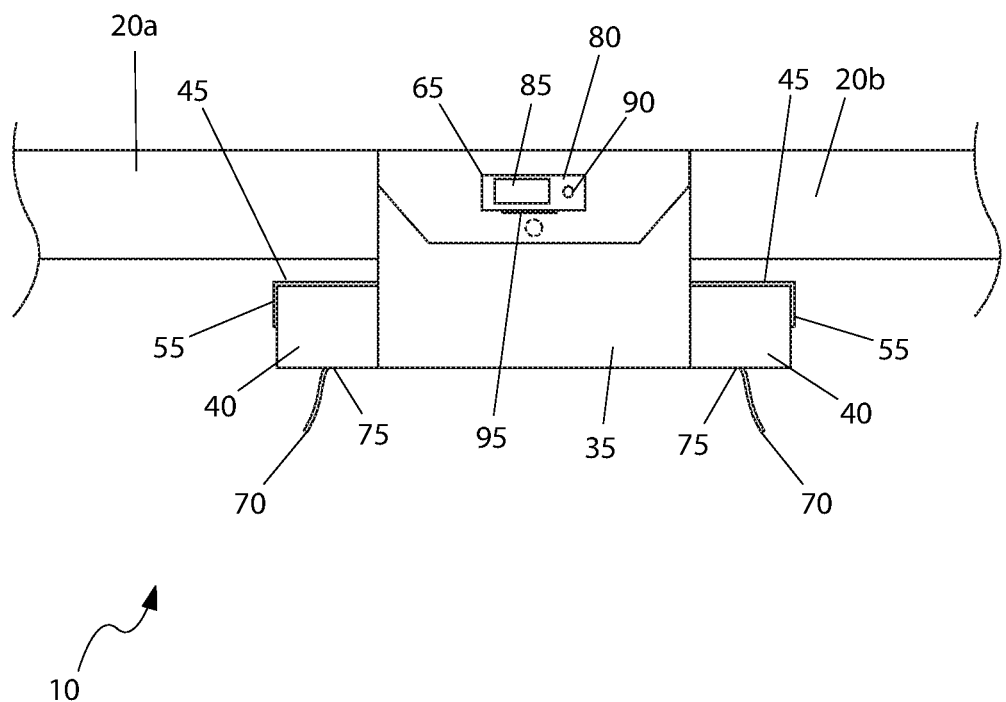
FIG. 2 is a front view of the pet dropping container 10, according to the preferred embodiment of the present invention.

Referring next to FIG. 2, a front view of the container 10, according to the preferred embodiment of the present invention is depicted. The bag dispensing compartments 40 are shown on either side of the main retention compartment 35 to accommodate either right-handed or left-handed individuals as well as being worn on either side of the user's body. The bag dispensing compartments 40 are used to each hold dropping collection bags 70, envisioned to be provided in a roll format and dispensed through a bottom slot 75. The top flaps 45 of each bag dispensing compartment 40 is secured by the fastener 55 to allow easy access for refilling of the dropping collection bags 70. The light assembly 65 includes a housing 80 which houses an impact resistant plastic material that contains a lens assembly 85 and a maintained power switch 90. The light assembly 65 utilizes light emitting diodes (LED's) at a high brightness level but utilizing low power as supplied by AAA batteries. The batteries are accessed for replacement via a battery access door 95 on the bottom of the plastic housing 80.

Figure 3:
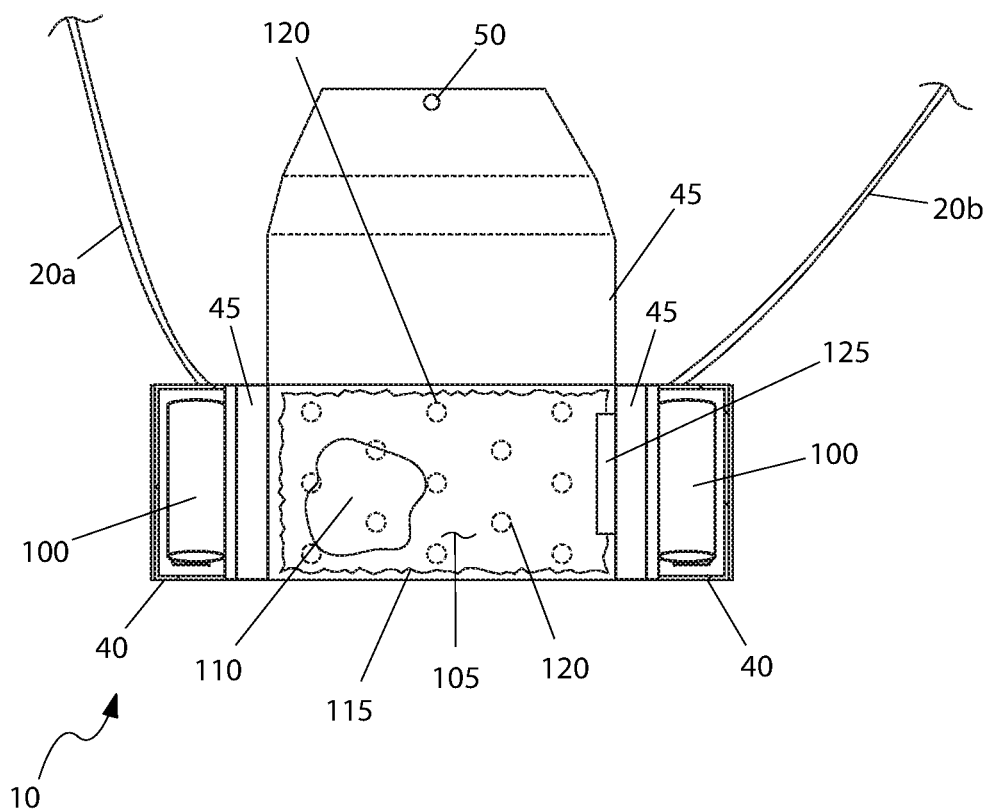
FIG. 3 is a top view of the pet dropping container 10 with the top flaps 45 in an open state, according to the preferred embodiment of the present invention.

Referring now to FIG. 3, a top view of the container 10 with the top flaps 45 in an open state, according to the preferred embodiment of the present invention is shown. The top flaps 45 on the bag dispensing compartments 40 are open to expose a roll of dropping collection bags 100. The top flap 45 on the main retention compartment 35 is open to expose an interior retention area 105 for the temporary holding of filled dropping collection bags 110. The interior retention area 105 is provided with a liner bag 115 which remains in place for many uses to catch spill, drips, leaks or breaks from the filled dropping collection bags 110 should they occur. It is envisioned that the liner bag 115 will be removed and replaced or cleaned on a periodic, as needed, basis. The bottom surface of the interior retention area 105 is provided with a plurality of vent holes 120 (here shown by dashed lines due to their hidden nature by the liner bag 115) to aid in removing foul odors. To further the odor-reducing effort, a side mounted interior storage compartment 125 is provided to hold user provided deodorizing means, which may or may not be used depending on the desires of the user. The top flap 45 for the main retention compartment 35 is provided with the magnetic catch 50 as aforementioned described, now visible in this figure, due to the open nature of the top flap 45.

Figure 4:
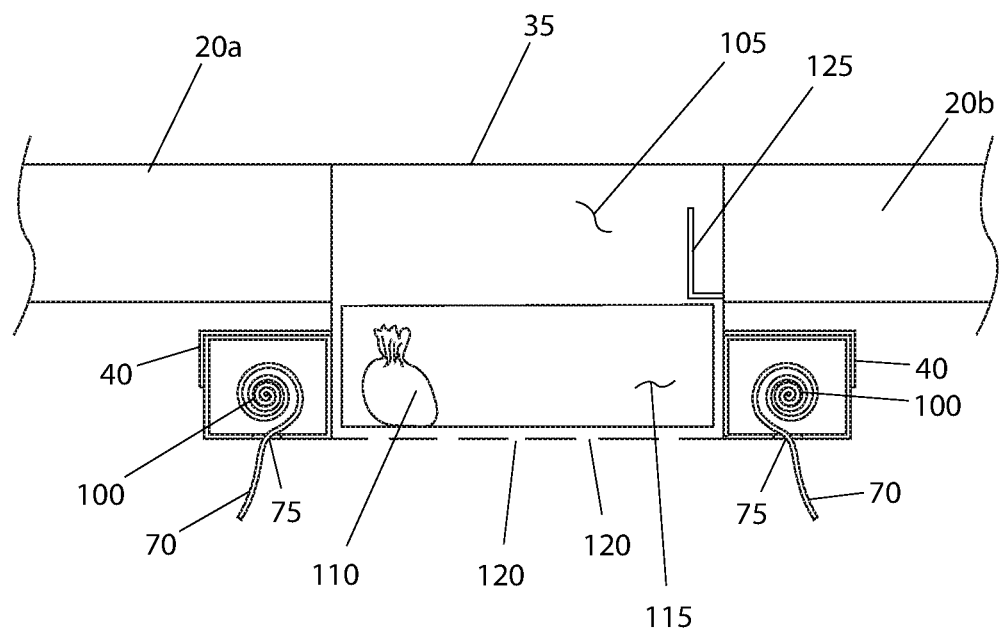
FIG. 4 is a sectional view of the pet dropping container 10, as seen along a line I-I, as shown in FIG. 1, according to the preferred embodiment of the present invention; and, FIG. 5 is an illustrative view pet dropping container 10, shown in a utilized state, according to the preferred embodiment of the present invention.

Referring next to FIG. 4, a sectional view of the container t 10, as seen along a line I-I, as shown in FIG. 1, according to the preferred embodiment of the present invention is disclosed. This figure provides additional clarification on the liner bag 115 which extends approximately one-half (½) way up the main retention compartment 35. It is noted that that the liner bag 115 can hold multiple filled dropping collection bags 110 (only one (1) shown here for purposes of clarity). The vent holes 120 are visible in the bottom surface of the main retention compartment 35. The roll of dropping collection bags 100 are visible in the bag dispensing compartments 40 on both sides with a single dropping collection bag 70 deployed from each bottom slot 75. The interior storage compartment 125 is visible on the upper half of the interior retention area 105 of the main retention compartment 35.

Figure 5:
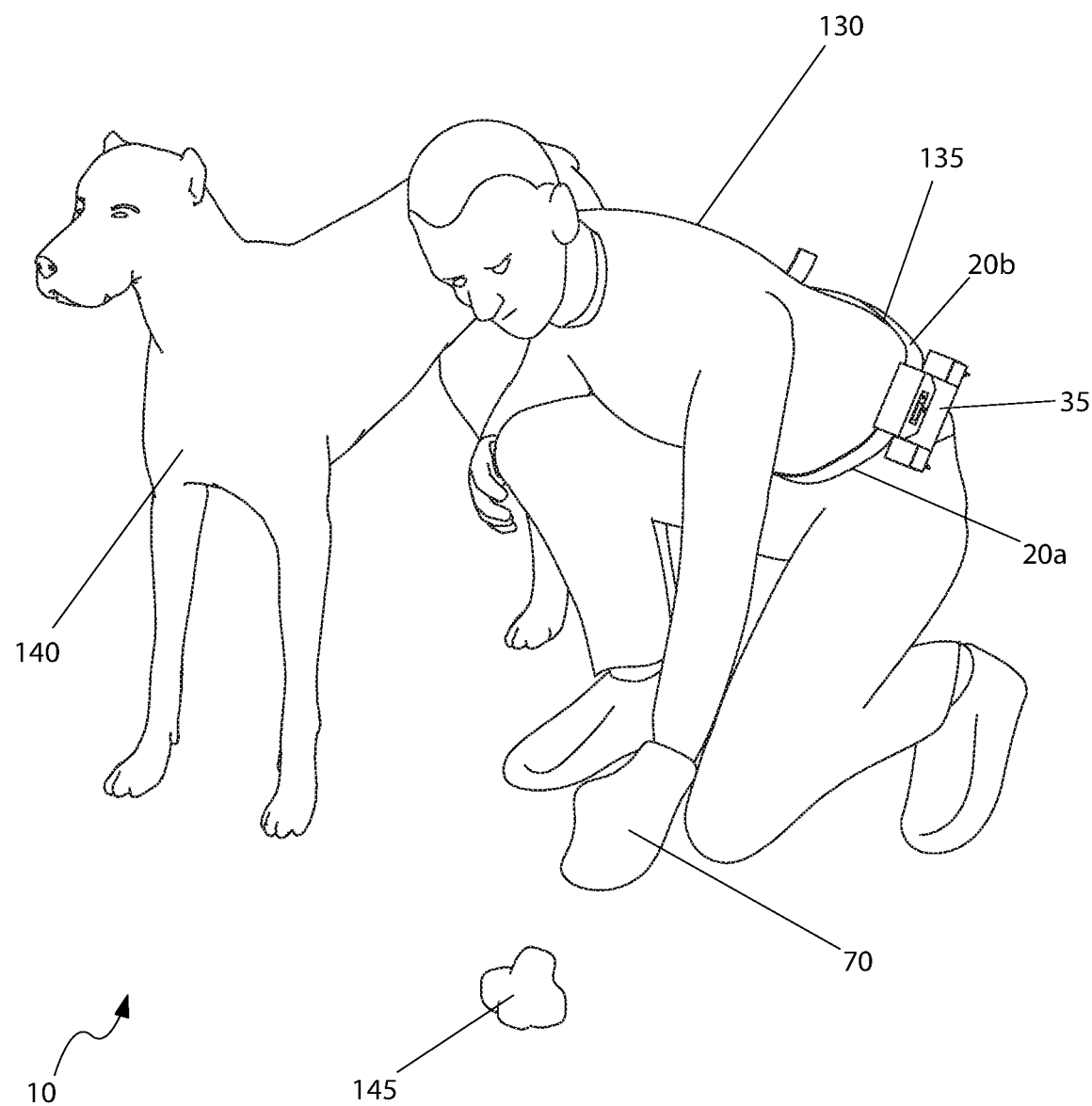

Referring to FIG. 5, an illustrative view container 10, shown in a utilized state, according to the preferred embodiment of the present invention is depicted. A user 130 wears the container 10 about the waist 135 secured by the belt 20 while walking a pet 140. Should the pet 140 defecate, the user 130 would pull a dropping collection bags 70 from either of the two (2) bag dispensing compartments 40 and pick up the droppings 145 in a conventional and well-known manner. Next, the user 130 would secure the opening of the dropping collection bags 70 via twisting, knotting, tying, or the like. The user 130 then lifts the top flap 45 on the main retention compartment 35 and drops the filled dropping collection bags 110. This action frees both hands for other uses, such as holding a leash, holding a handrail, talking on a cell phone or the like. When arriving at a suitable disposal site, such as a trash can, the user 130 can retrieve of the filled dropping collection bags 110 and dispose of it, allowing the container 10 to be used over and over whenever a pet 140 is walked, assured that all necessary items for proper disposal of droppings 145 are at hand.

2. Operation of the Preferred Embodiment

The preferred embodiment of the present invention can be utilized by the common user in a simple and effortless manner with little or no training. It is envisioned that the container 10 would be constructed in general accordance with FIG. 1 through FIG. 5. The user would procure the container 10 from conventional procurement sources such as pet stores, discount stores, mail order and internet supply houses. Special attention would be paid to items such as color and style of the container 10.

After procurement and prior to utilization, the container 10 would be prepared in the following manner: the belt length adjustment means 30 would be manipulated to fit the waist 135 of the user 130; roll of dropping collection bags 100 would be placed in the two (2) bag dispensing compartments 40 with the loose end extending out the bottom slot 75; any deodorizing means would be placed in the interior storage compartment 125, batteries would be placed in the light assembly 65 by removal of the battery access door 95; and the container 10 placed and secure on the waist 135 of the user 130.

During utilization of the container 10, the following procedure would be initiated: the pet 140 would be walked in a normal and conventional manner; should the pet 140 defecate, the user 130 would pull a dropping collection bags 70 from either of the two (2) bag dispensing compartments 40 and pick up the droppings 145 as shown in FIG. 5. Next, the user 130 would secure the opening of the dropping collection bags 70 via twisting, knotting, tying, or the like. The user 130 then lifts the top flap 45 on the main retention compartment 35 and drops the filled dropping collection bags 110 into the interior retention area 105. This action frees both hands for other uses, such as holding a leash, holding a handrail, talking on a cell phone or the like. When arriving at a suitable disposal site, such as a trash can, the user 130 can retrieve of the filled dropping collection bags 110 and dispose of it, allowing the container 10 to be used over and over whenever a pet 140 is walked, assured that all necessary items for proper disposal of droppings 145 are at hand.

After use of the container 10, it is wiped clean if needed; the liner bag 115, if used, can be replaced on an as needed basis; the deodorizing means as well as the batteries for the light assembly 65 can be replaced on an as needed basis as well. At this point in time, the container 10 is stored for use until needed again in a repeating and cyclical manner.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order to best explain the principles of the invention and its practical application, to thereby enable others skilled in the art to best utilize the invention and various embodiments with various modifications as are suited to the particular use contemplated.

What is claimed is:

1. A refuse bag, comprising:
   a bag assembly worn about a person's waist on a belt assembly, the belt assembly includes a belt first half with a buckle first half removably mating with a buckle second half of a belt second half, the bag assembly includes a main retention compartment with a pair of bag dispensing compartments located on each side of the belt assembly, each of the pair of bag dispensing compartments and main retention compartment are provided with a top flap which are held in place via a fastener;
   a logo area provided on a front lower face of the main retention compartment;
   a light assembly located on a face of the main retention compartment top flap, the light assembly is on the main retention compartment immediately above a magnetic catch for illumination purposes, the light assembly includes a housing that contains a lens assembly and a maintained power switch; and wherein the bag dispensing compartments are used to each hold a plurality of dropping collection bags provided in roll format and dispensed through a bottom slot.

2. The refuse bag according to claim 1, wherein the main retention compartment top flap is held in place via the magnetic catch.

3. The refuse bag according to claim 1, wherein the belt halves mate with a quick-release buckle.

4. The refuse bag according to claim 1, wherein the belt halves, the main retention compartment, and each of the pair of bag dispensing compartments are each made of nylon.

5. The refuse bag according to claim 1, wherein the belt halves are each made of polyester.

6. The refuse bag according to claim 1, wherein the main retention compartment is made of plastic.

7. The refuse bag according to claim 1, wherein the bag dispensing compartments are shown on either side of the main retention compartment to accommodate either a right-handed person or a left-handed person.

8. The refuse bag according to claim 1, wherein the top flaps of each of the bag dispensing compartments are secured by the fastener to allow easy access for refilling of the dropping collection bags.

9. The refuse bag according to claim 1, wherein the fastener is a hook-and-loop fastener.

10. The refuse bag according to claim 1, wherein the logo area displays an indicia selected from the group consisting of a product name, a piece of graphics, or a customized letter.

11. The refuse bag according to claim 1, wherein the logo area is produced using glow-in-the-dark ink.

12. The refuse bag according to claim 1, wherein the logo area is produced using glow-in-the-dark paint.

13. The refuse bag according to claim 1, wherein the top flap on the main retention compartment is open to expose an interior retention area for temporary holding of one or more filled dropping collection bags.

14. The refuse bag according to claim 13, wherein the interior retention area is provided with a liner bag which remains in place to catch one or more spills, one or more drips, one or more leaks, or one or more breaks from the one or more filled dropping collection bags.

15. The refuse bag according to claim 13, wherein a bottom surface of the interior retention area is provided with a plurality of vent holes to aid in removing foul odors.

16. The refuse bag according to claim 15, further comprising a side mounted interior storage compartment is provided to hold a deodorizer.

17. The refuse bag according to claim 1, wherein the light assembly utilizes one or more LED's at a high brightness level while utilizing low power supplied by one or more AAA batteries.

18. The refuse bag according to claim 17, wherein the one or more AAA batteries are accessed for replacement via a battery access door on a bottom of the housing.

19. The refuse bag according to claim 18, wherein the housing is made of an impact resistant plastic material.

* * * * *